March 1, 1960 A. D. PINOTTI 2,926,459

METHOD OF FORMING A HOLLOW GLASS ARTICLE

Filed March 8, 1955

INVENTOR
ALFRED D. PINOTTI
BY
ATTORNEY

United States Patent Office 2,926,459
Patented Mar. 1, 1960

2,926,459

METHOD OF FORMING A HOLLOW GLASS ARTICLE

Alfred D. Pinotti, Toledo, Ohio, assignor to Owens-Illinois Glass Company, a corporation of Ohio Application March 8, 1955, Serial No. 492,882

3 Claims. (Cl. 49—85)

This invention relates to an improved method of manufacturing a hollow glass article, and more particularly, relates to an improved method of forming funnel parts for glass cathode ray tubes by pressing or centrifugal casting processes.

In the manufacture of glass cathode ray tubes for television receivers, it has been customary to initially form the tube blanks in two parts, namely a face plate and a so-called "funnel portion," which has a large diameter end which is eventually integrally joined to the face plate, and a small diameter neck end, which is utilized to mount the electrical components of the cathode ray tube. In order to effect the integral juncture of the funnel with the face plate, the expansion characteristics of the glass of the funnel should closely approach that of the face plate. Likewise, it is equally desirable that the glass characteristic of the neck end of the funnel have expansion characteristics and compositions best suitable for sealing to metallic elements. It happens that the most desirable glass compositions for face plate manufacture are substantially different, particularly in expansion coefficient characteristics, from the glass compositions that are best suited for making metallic seals. To resolve this conflict, it has been customary in the past to form the major portion of the funnel from a glass having expansion coefficient characteristics corresponding to those of the face plate glass and to integrally unite to the small end of the funnel a so-called "neck ring" which is fabricated from a glass best suited for metallic sealing purposes. This procedure not only resulted in a more expensive manufacturing process, but the resulting tube was weakened due to the stresses inherently produced by the integral juncture of the funnel glass with the neck ring glass.

Accordingly, it is an object of this invention to provide an improved method of forming a funnel for a cathode ray tube wherein the glass composition of one end of the funnel may differ substantially from the glass composition of the other end of the funnel, but both ends of the funnel and the juncture therebetween are concurrently formed in the same forming mold, thereby economically producing a stronger funnel than has been heretofore provided.

Still another object of this invention is to provide an improved method for forming a hollow glass article of the type having differing glass compositions at its opposite end portions, characterized by the sequential deposit of two gobs of molten glasses of differing compositions in a single mold and the concurrent displacement of such gobs within the mold to form the desired article.

The specific nature of this invention, as well as other objects and advantages thereof, will become apparent to those skilled in the art from the following detailed description, taken in conjunction with the annexed sheet of drawings on which, by way of preferred example only, is illustrated an embodiment of this invention.

While this invention will be particularly described and illustrated in connection with the formation of a funnel for a cathode ray tube, it will be apparent to those skilled in the arts that the principles of this invention may be equally applied to the formation of any other type of hollow glass articles.

Figure 1:
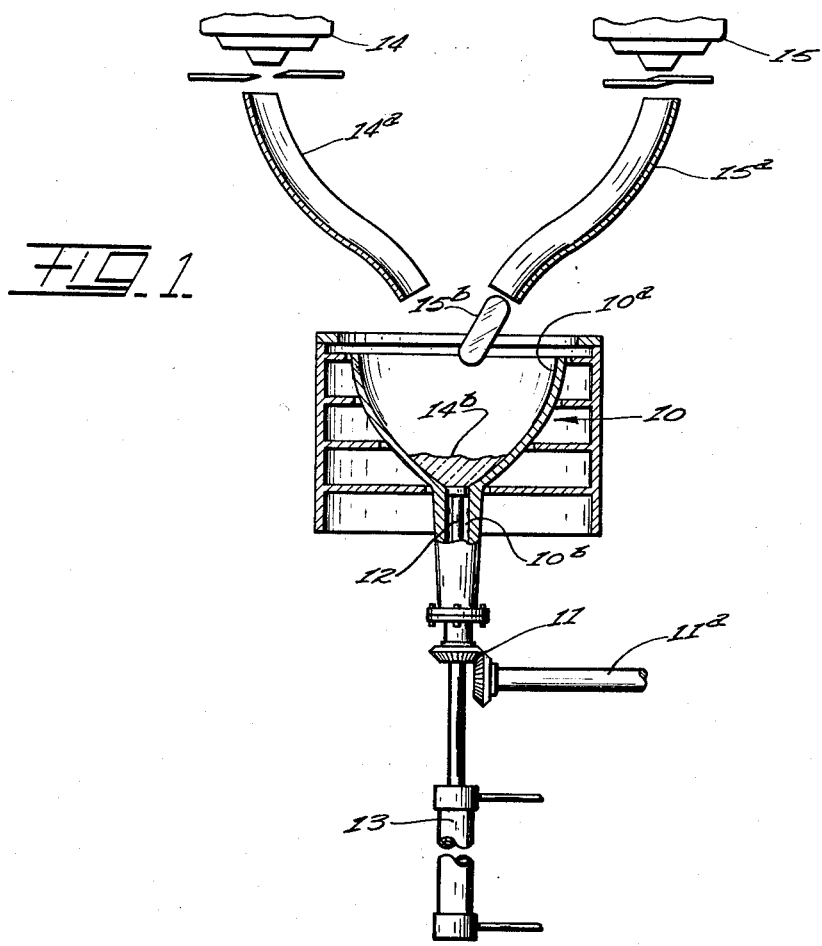
Figure 1 is a schematic illustration of glass forming apparatus for carrying out the method of this invention.

Referring to Figure 1, numeral 10 represents a conventional form of centrifugal casting mold utilized for the production of funnels for cathode ray tubes. Mold 10 includes an interior funnel mold surface 10a which defines the desired exterior shape of the cathode ray tube funnel. Mold 10 is suitably mounted for rotation about its vertical axis and is adapted to be driven by a set of beveled gears 11, which communicate with a suitable source of mechanical power (not shown) by a shaft 11a. The central stem portion 10b of mold 10 is of a hollow cylindrical configuration and slidably receives therein a plunger 12, whose vertical position is controlled by a connected fluid cylinder 13.

In the formation of a cathode ray tube funnel by conventional methods, the plunger 12 is initially positioned near the juncture of the funnel portion 10a and the neck portion 10b of the mold and a gob of glass is deposited therein. The mold 10 is then rotated at a high speed by the application of mechanical driving power through beveled gears 11, and the plunger 12 is concurrently drawn downwardly to permit the glass to flow into the hollow stem portion 10b of the mold. The major portion of the glass is centrifugally displaced to flow outwardly and upwardly along the interior mold surfaces 10a and thus produce a funnel-shaped layer of glass which can be removed from the mold 10 after sufficient cooling to rigidify it.

In accordance with this invention, a pair of gob feeders 14 and 15, of conventional construction, are provided which respectively connect to two different sources of molten glass of substantially differing composition and physical characteristics. Gob chutes 14a and 15a are respectively associated with the feeders 14 and 15 to direct severed gobs from each feeder into the interior of mold 10. The operation of the feeders 14 and 15 is synchronized so that the glass gobs produced by such feeders are sequentially introduced into the mold 10. Thus, as illustrated in Figure 1, a gob 14b from feeder 14 is first deposited in mold 10, and immediately thereafter a gob 15b from feeder 15 is deposited on top of the layer of molten glass in the mold produced by gob 14b. To insure that the gob 15b will be displaced toward the upper end of the mold 10, it is preferable that the gob 15b be positioned in such manner that it will overlie the periphery of the gob 14b. It should be mentioned also that gob 14b should be of sufficient volume so as to effectively cover the lower surface of the funnel portion 10a of mold 10, i.e., there should be sufficient glass in the first gob introduced to produce a continuous supporting layer of molten glass upon which the second glass gob 15b may be deposited.

Figure 2:
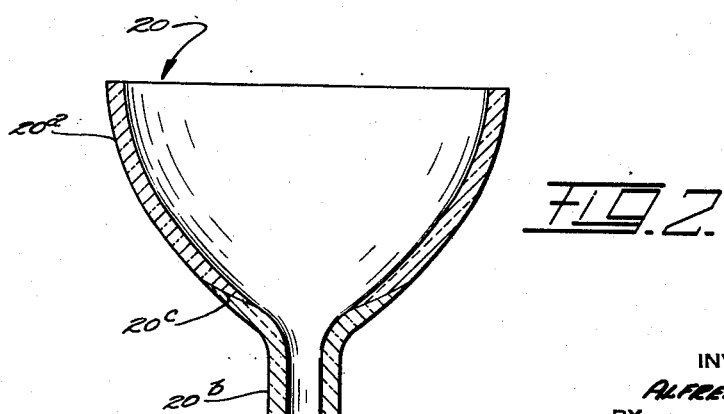
Figure 2 is an axial sectional view of a cathode ray tube funnel embodying this invention and fabricated in accordance with the method of this invention.

The mold 10 is then rotated to concurrently centrifugally displace all of the molten glass contained within the mold 10 to conform to the configuration of its interior surfaces and, when the glass has rigidified, the resulting funnel 20 (Figure 2) is removed from the mold 10. Alternatively, instead of sequentially depositing gobs 14b and 15b in a centrifugal casting type mold, such gobs may be sequentially deposited in an ordinary press mold, and the subsequent concurrent displacement of the molten glass within the press mold may be accomplished in conventional manner by the insertion of a cooperating plunger within such mold.

In either event the aforedescribed method results in the production of a funnel 20, of which the top portion 20a is formed of glass of one composition, namely, that provided by feeder 15, and the lower portion 20b is formed of glass corresponding in composition to that supplied by feeder 14. The annular juncture between the two glass compositions extends over an area which is substantially greater than the wall thickness area at the same location, as indicated at the tapered juncture line 20c. The strength of the juncture is thus substantially increased and the characteristics of the glass in this area, particularly as to expansion coefficient, represents a modification or blending of the characteristics of the two individual glass compositions. As a result, the area of juncture is substantially free from residual stresses, and the funnel 20 is, therefore, inherently much stronger and more stable than a funnel conventionally produced by the integral endwise joining of two parts of differing glass composition. Thus, the composition of the funnel portion 20a may be selected to correspond to that of the face plate to which the funnel 20 will be integrally united, while the composition of neck portion 20b may be selected to provide a glass having optimum metal sealing characteristics. Obviously, other desirable variations in the glass composition of the two end portions may be provided, and, if desired, more than two glass compositions can be introduced in the same article by utilizing the described technique of sequential introduction of glass gobs of different compositions into a single forming mold.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. In the manufacture of a hollow glass article by rotation of a mold, the improvement comprising sequentially inserting two gobs of glasses of different composition in the bottom of said mold, said first gob being of sufficient volume to provide a glass layer extending across the interior of said mold upon which the second of said gobs is deposited, said second gob being positioned to overlie the periphery of said first gob, and then rotating said mold to centrifugally cast said gobs into a unitary article.

2. A method of manufacture of the funnel portion of a glass cathode ray tube comprising the steps of sequentially inserting two gobs of glasses having different glass compositions in a centrifugal funnel shaped casting mold, said second gob being positioned to overlie the periphery of said first gob, and rotating said mold to form the funnel by centrifugal displacement of the glass over the mold surfaces, whereby the top portion of said funnel is formed entirely of one of said glasses and the bottom stem portion is formed entirely of the other of said glasses.

3. A method of manufacture of a hollow glass article comprising the steps of sequentially inserting two gobs of glasses having different glass compositions in a centrifugal casting mold, said second gob being positioned to overlie the periphery of said first gob, and rotating said mold to form by centrifugal displacement of the glass over the mold surfaces an article having one axial end portion formed entirely of one of said glasses and the other axial end portion formed entirely of the other of said glasses.

References Cited in the file of this patent

UNITED STATES PATENTS

| | | |
|---|---|---|
| 1,266,785 | Finkbeiner | May 21, 1918 |
| 1,372,164 | Sigvart | Mar. 22, 1921 |
| 1,908,306 | Best | May 9, 1933 |
| 2,374,269 | Breadner et al. | Apr. 24, 1945 |
| 2,494,582 | Prokopec | Jan. 17, 1950 |
| 2,564,897 | Hahn | Aug. 21, 1951 |
| 2,662,346 | Giffen | Dec. 15, 1953 |
| 2,744,034 | Dalton et al. | May 1, 1956 |

FOREIGN PATENTS

| | | |
|---|---|---|
| 395,599 | Great Britain | July 20, 1933 |
| 670,411 | Great Britain | Apr. 16, 1952 |
| 510,486 | Canada | Mar. 1, 1955 |